(12) United States Patent
Soo

(10) Patent No.: US 12,271,188 B2
(45) Date of Patent: *Apr. 8, 2025

(54) SYSTEM AND METHOD FOR MANAGING CONTROL PERFORMANCE OF A BUILDING AUTOMATION DEVICE

(71) Applicant: Siemens Industry, Inc., Alpharetta, GA (US)

(72) Inventor: Ryan Soo, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 563 days.

This patent is subject to a terminal disclaimer.

(21) Appl. No.: 17/497,047

(22) Filed: Oct. 8, 2021

(65) Prior Publication Data

US 2023/0051907 A1  Feb. 16, 2023

Related U.S. Application Data

(63) Continuation-in-part of application No. 17/400,990, filed on Aug. 12, 2021, now abandoned.

(51) Int. Cl.
*G05B 23/02* (2006.01)
*G05B 15/02* (2006.01)

(52) U.S. Cl.
CPC ......... *G05B 23/0297* (2013.01); *G05B 15/02* (2013.01)

(58) Field of Classification Search
None
See application file for complete search history.

(56) References Cited

U.S. PATENT DOCUMENTS

| 5,043,862 | A | * | 8/1991 | Takahashi | G05B 13/0275 |
| | | | | | 706/900 |
| 5,213,077 | A | | 5/1993 | Nishizawa et al. | |
| 5,295,061 | A | * | 3/1994 | Katayama | G05B 13/0275 |
| | | | | | 706/900 |
| 6,198,246 | B1 | * | 3/2001 | Yutkowitz | G05B 11/42 |
| | | | | | 318/610 |
| 7,856,281 | B2 | * | 12/2010 | Thiele | G05B 13/048 |
| | | | | | 700/32 |
| 9,777,937 | B2 | * | 10/2017 | Endel | F24F 11/62 |
| 2010/0228363 | A1 | * | 9/2010 | Denison | G05B 13/0275 |
| | | | | | 700/11 |
| 2011/0054640 | A1 | * | 3/2011 | Law | G05B 19/418 |
| | | | | | 700/32 |

(Continued)

*Primary Examiner* — Jennifer L Norton

(57) ABSTRACT

There is described a system and method for managing control performance of a field device receiving variable data. Variable and setpoint references corresponding to a control loop of the field device are identified. A time delay normal period based on expected oscillations of the variable reference and settling limits associated with the setpoint reference are also identified. An offnormal timestamp is generated based on the variable reference relative to one or more second pre-settling limits associated with the setpoint reference. A normal timestamp is generated based on the variable reference relative to the settling limits. A settling time of the control performance is determined based on the normal timestamp, the offnormal timestamp, and the time delay normal period. One or more performance features of the field device are modified based on the determined settling time.

12 Claims, 10 Drawing Sheets

(56) References Cited

U.S. PATENT DOCUMENTS

| | | | |
|---|---|---|---|
| 2012/0035802 A1* | 2/2012 | Suzuki | E02F 9/26 |
| | | | 701/29.1 |
| 2012/0158361 A1 | 6/2012 | Raman et al. | |
| 2012/0215326 A1* | 8/2012 | Brown | G05B 19/0426 |
| | | | 700/42 |
| 2017/0074533 A1* | 3/2017 | Ji | G05B 13/0265 |
| 2018/0052437 A1* | 2/2018 | Leonelli | G05B 19/05 |
| 2018/0196402 A1* | 7/2018 | Glaser | G05B 19/042 |
| 2018/0210430 A1* | 7/2018 | Balduf | G05B 19/4186 |
| 2020/0319610 A1* | 10/2020 | Ray | G06Q 10/063 |
| 2021/0141346 A1* | 5/2021 | Wenzel | G05B 13/041 |
| 2021/0325863 A1* | 10/2021 | Thoren | G05B 23/0272 |
| 2022/0075362 A1* | 3/2022 | Vitullo | G05B 23/0264 |
| 2022/0269230 A1* | 8/2022 | Mueller | F24F 11/62 |

\* cited by examiner

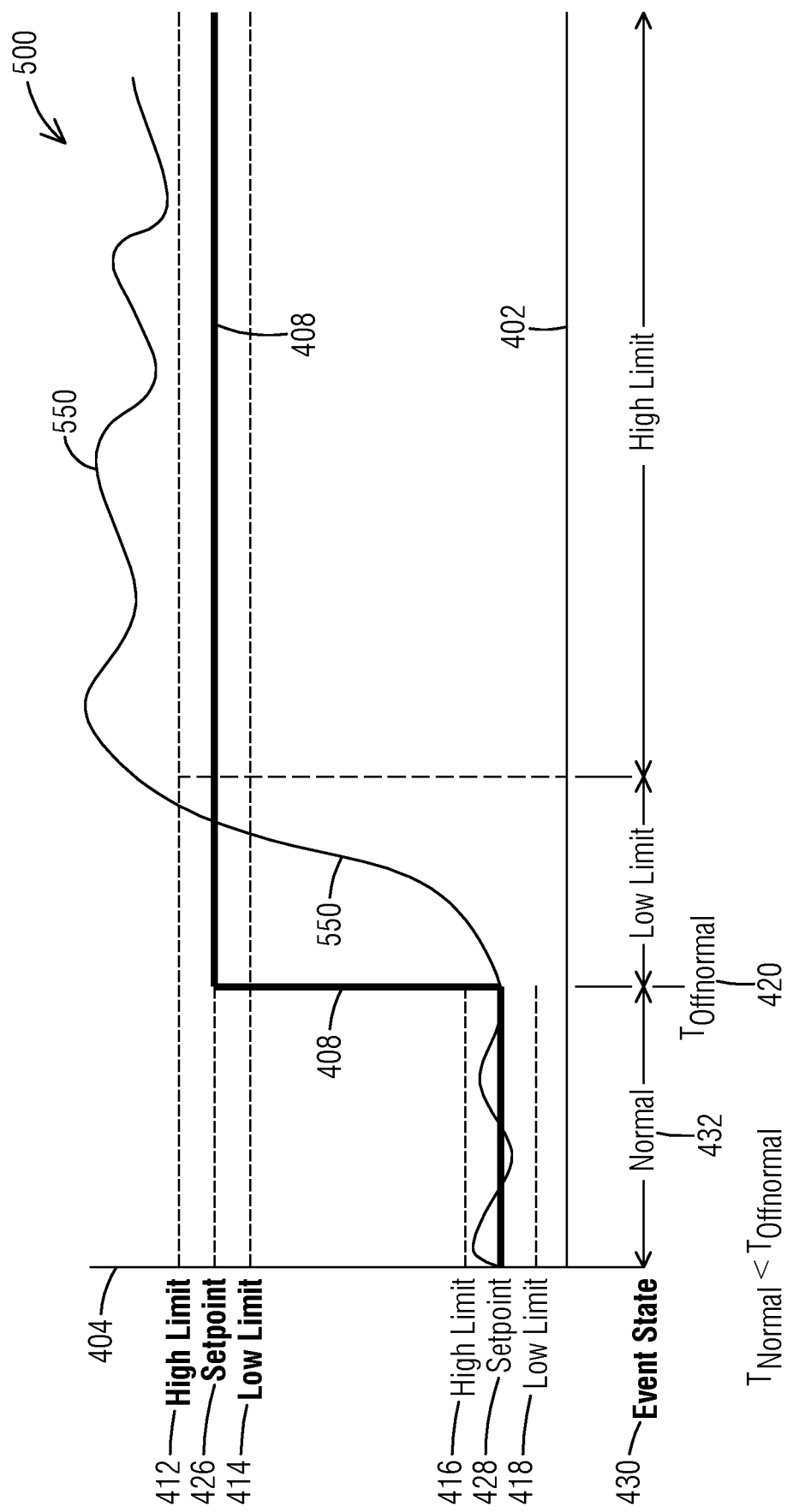

SYSTEM AND METHOD FOR MANAGING CONTROL PERFORMANCE OF A BUILDING AUTOMATION DEVICE

RELATED APPLICATIONS

This application is a continuation-in-part of U.S. patent application Ser. No. 17/400,990, titled System and Method for Managing Control Performance of a Building Automation Device, by Ryan Soo, filed on Aug. 12, 2021, and incorporated by reference in its entirety.

FIELD OF THE INVENTION

This application relates to the field of building automation systems and, more particularly, to management of field devices for the building automation systems.

BACKGROUND

Building automation systems encompass many field devices, widely dispersed throughout a facility, that aid in the monitoring and control of various aspects of building operation, such as comfort, reliability, and energy savings. Examples of building automation systems include security systems, fire safety systems, lighting systems, and heating, ventilation, and/or air conditioning ("HVAC") systems. The field devices of a building automation system utilize control mechanisms to maintain high precision for these monitoring and control features. One way to measure the performance of a control mechanism is to observe a settling time of a step response. The response may be eyeballed by a technician from a trend plot or determined by a separate data acquisition and processing system.

Currently, there is a problem with technician managing a field device of a building automation system, particularly for estimating controller response via visual inspection of a trend graph. Due to this difficulty, a technician could need a substantial amount of time for managing each device and, even then, the resulting performance from such maintenance may not be precise. In some cases, technicians may not even bother with any maintenance actions due to this difficulty, thereby leaving gaps for energy inefficiencies and poor safety responses. In addition, there are directions in the American Society of Heating and Air-Conditioning Engineers ("ASHRAE") standards, for example with respect to fume hoods, to periodically assess and monitor the performance within a building automation system. With a typical project having 100+ operations (i.e., 50+ labor hours for the project), a technician or operator can be under substantial pressure to assess and service the performance of such operations more quickly and accurately.

A technician may also experience problems with servicing operations by a separate data acquisition and processing system. For every operation, the technician may need to step through a manual process to collect relevant data and generate a graphical view of the performance. For higher performance and accurate systems, the data collection of relevant data would benefit from a separate data acquisition system. The technician may then visually analyze the graphics, or analyze the data values directly, to assess the estimated performance of the respective operation so that the technician can identify corrections. The technician would need to repeat the process until she or he reached some level of confidence in achieving the desired performance. Thus, even with a separate data acquisition and processing system, a technician or operator is under substantial pressure to assess and service the performance of field device operations quickly and accurately.

SUMMARY

In accordance with one embodiment of the disclosure, there is provided a control performance measurement and management approach for a building automation system ("BAS"). The approach facilitates determination of a settling time of a control loop so that a lab, building operator, or safety officer may quickly and usefully measure control performance during periodic checks. Events of an object, which may change values based on determined criteria, may be configured to determine and otherwise manage the settling time of the control loop. The settling time may be determined based on the deviation of normal time, offnormal time, and monitoring time from normal. For some embodiments, the settling time may then become, and be recorded as, a property of the object. As a result, the approach determines the settling time of the control loop to allow a technician to tune or otherwise manage a control loop to a concrete value instead of eyeballing a trend plot. The approach may also be used for fault detection & diagnostic, particularly with respect to a high, low, and/or unstable loop, and save time for the technician to setup/commission the BAS.

For some embodiments, control performance may be quickly implemented and determined with an Event Enrollment Object, thus reducing the skill level required to assess and service the control performance. Control performance may also be detected onboard a device without any additional or outside equipment/resources. As a result, a technician may tune or otherwise manage control loops and get quick immediate feedback, thereby allowing the technician to make immediate adjustments to the control loops. For example, the control parameters may be automatically adjusted to achieve the desire settling time.

One aspect is a method for managing control performance of a building automation device. Variable data is received at a field device. A variable reference and a setpoint reference are identified, the variable and setpoint preferences corresponding to a control loop of the field device and associated with the variable data. A time delay normal period is identified based on expected oscillations of the variable reference, a high settling limit associated with the setpoint reference is identified, and a low settling limit associated with the setpoint reference is identified. An offnormal timestamp is generated based on the variable reference relative to a high pre-settling limit associated with the setpoint reference, a low pre-settling limit associated with the setpoint reference, or both. The high and low pre-settling limits are different from the high and low settling limits. A normal timestamp is generated based on the variable reference relative to the high settling limit and the low settling limit. A settling time of the control performance is determined based on the normal timestamp, the offnormal timestamp, and the time delay normal period. One or more performance features of the field device are modified based on the determined settling time.

Another aspect is a building automation system for managing control performance of a building automation device. A field device is configured to receive variable data at a field device, in which the field device has one or more performance features modified by a settling time. The field device or a management device communicating with the field device are configured to perform the following functions. A variable reference and a setpoint reference are identified, the variable and setpoint references corresponding to a control loop of the field device and associated with the variable data. A time delay normal period is identified based on expected oscillations of the variable reference, a high settling limit associated with the setpoint reference is identified, and a low settling limit associated with the setpoint reference is identified. An offnormal timestamp is generated based on the variable reference relative to a high pre-settling limit associated with the setpoint reference, a low pre-settling limit associated with the setpoint reference, or both. The high and low pre-settling limits are different from the high and low settling limits. A normal timestamp is generated based on the variable reference relative to the high settling limit and the low settling limit. The settling time of the control performance is determined based on the normal timestamp, the offnormal timestamp, and the time delay normal period.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIGS. 4, 5A, 5B, and 6 are graphical views illustrating control performance measurements in example operations by the management device of the BAS.

DETAILED DESCRIPTION

Figure 1:
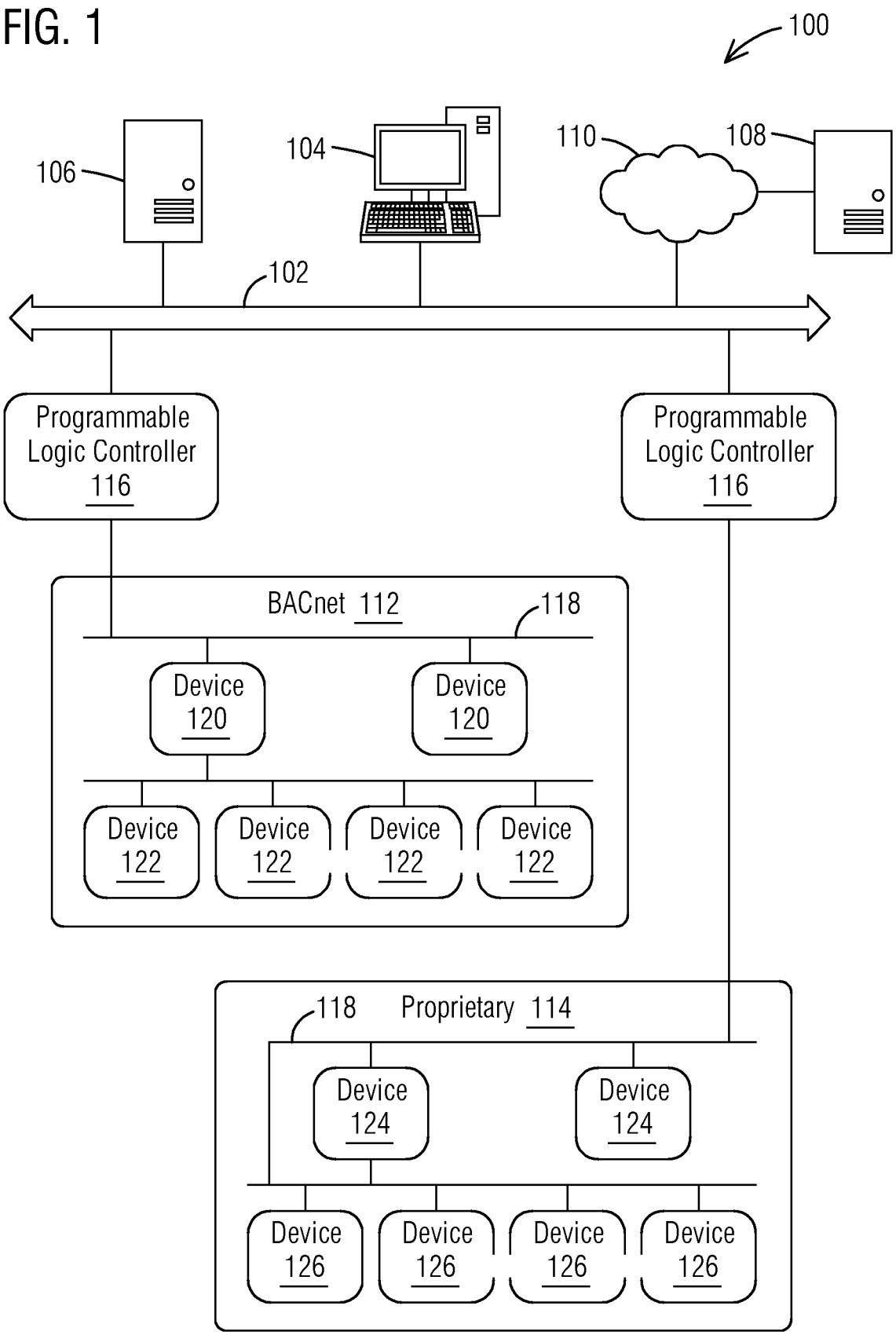
FIG. 1 is a schematic view illustrating a building automation system ("BAS") in an example implementation that is operable to employ techniques described herein.

Various technologies that pertain to systems and methods that facilitate control performance measurement and management of a building automation system ("BAS") will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system and method quickly and accurately assess the control performance of control loops of field devices within a BAS controller. Technicians may better tune control loops by giving immediate feedback to measure performance times and readjust loop tuning parameters. In addition, an operator may monitor control loop performance for other faults including, but not limited to, control instability, control variable too high, control variable too low, and other faults associated with terminal unit fault detection.

Referring to FIG. 1, there is shown a building automation system ("BAS") 100 in an example implementation that is operable to employ techniques described herein. The BAS 100 includes an environmental control system configured to control one or more environmental parameters for a facility, such as temperature, humidity, ventilation, lighting, fire safety, security, and the like. For example, the BAS 100 may comprise one or more network connections or primary buses 102 for connectivity to components of a management level network ("MLN") of the system. For one embodiment, the example BAS 100 may comprise one or more management devices, such as a management workstation 104, a management server 106, or a remote management device 108 connecting through a wired or wireless network 110, that allows the setting and/or changing of various controls of the system. A management device may also be a portable management device connecting through a wired or wireless link to an individual field device (as described below) that allows the setting and/or changing of various controls of the field device. While a brief description of the BAS 100 is provided below, it will be understood that the BAS 100 described herein is only one example of a particular form or configuration for a BAS. The system 100 may be implemented in any other suitable manner without departing from the scope of this disclosure. The management devices are configured to provide overall control and monitoring of a field device, a group of field devices, or the BAS 100.

For the illustrated embodiment of FIG. 1, the BAS 100 provides connectivity based on one or more communication protocols to subsystems for various environmental parameters such as components of comfort systems, safety systems, security systems, and lighting systems. For some embodiments, a subsystem 112 may provide connectivity based on a BACnet communication protocol. For some embodiments, a subsystem 114 may provide connectivity based on a proprietary communication protocol. Each subsystem 112, 114 may include various field devices 120, 122, 124, 126 for monitoring and controlling areas within a building or group of buildings. For comfort devices that monitor and control heating-cooling equipment, the field devices may include, but are not limited to, stations, field panels, field controllers, and the like. Examples of such device include, but are not limited to, a BACnet device, Lon Talk device, central plant controller, boiler controller, package unit controller, variable air volume ("VAV") box, and lighting controller. For safety devices that monitor and control fire protection equipment, the field devices include, but are not limited to controllers, control panels, detectors, alarm systems, video surveillance cameras, and the like.

Examples of field devices for security systems include, but are not limited to, video surveillance cameras and motion detectors.

For some embodiments, the BAS 100 may include one or more programmable logic controllers 116 for connectivity to components of a building level network (BLN) of the system 100. Each programmable logic controller 116 may connect the primary bus 102 of the MLN to a secondary bus 118 of the BLN. Each programmable logic controller 116 may also include management logic for switching, power quality, and distribution control for the BLN components. Some field devices 120, 124 may communicate directly with the network connection or secondary bus 118 of the BLN, whereas other field devices 122, 126 may communicate through, and perhaps be controlled by, another field device (such as device 120, 124).

In these illustrative embodiments, objects associated with the BAS 100 include anything that creates, processes, or stores information regarding data points, such as physical devices (controllers, field panels, sensors, actuators, cameras, etc.) and maintains data files, such as control schedules, trend reports, defined system hierarchies, and the like. The illustration of the BAS 100 in FIG. 1 is not meant to imply physical or architectural limitations to the manner in which different illustrative embodiments may be implemented. Other components in addition to and/or in place of the ones illustrated may be used, and some components may be unnecessary in some illustrative embodiments.

Figure 2:
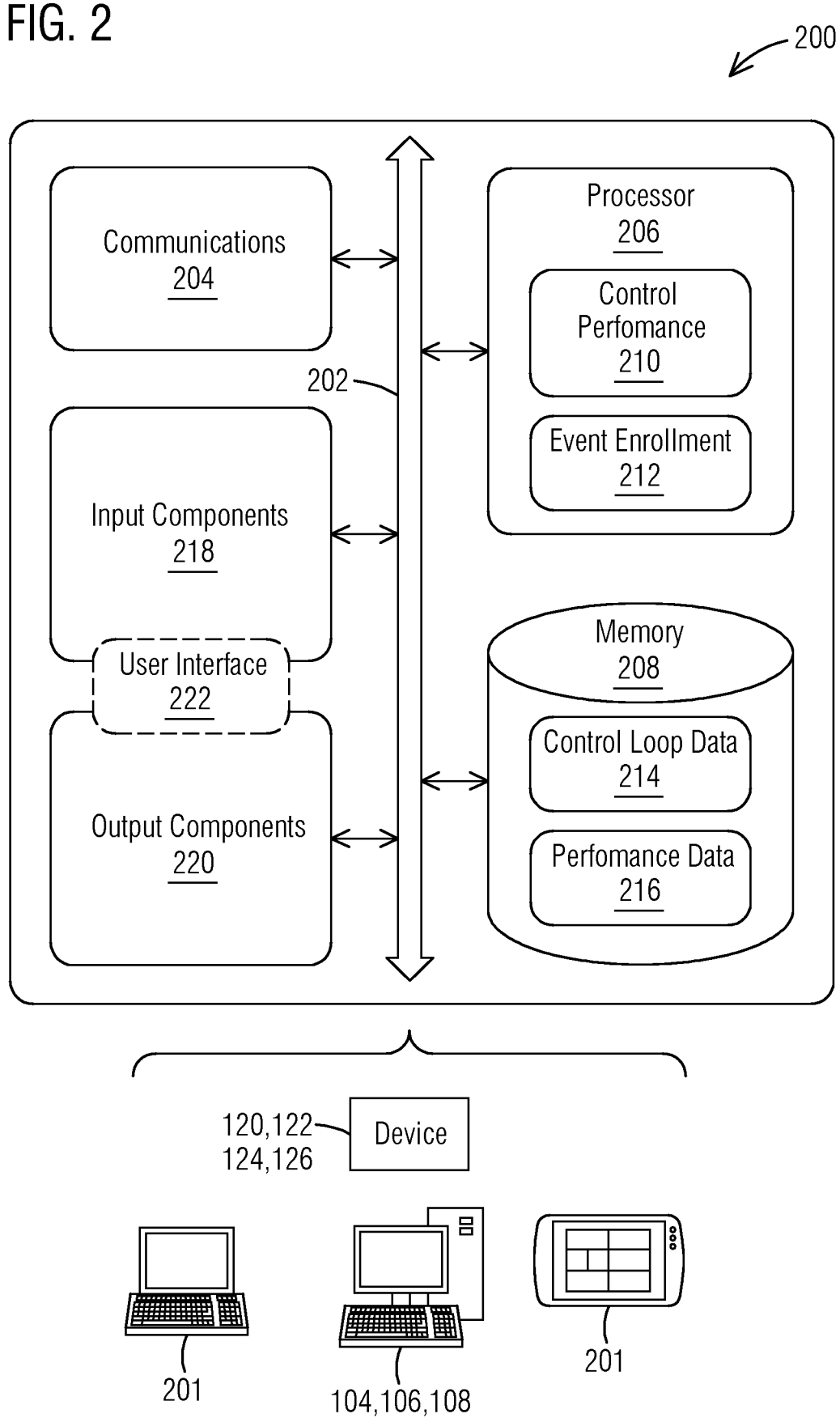
FIG. 2 is a block diagram depicting an example implementation of a management device and/or field device, such as those shown with the BAS of FIG. 1.

FIG. 2 represents example device components 200 of a management device, such as, such as the management workstation 104, management server 106, remote management device 108, portable management device 201, and/or field device 120-126 for the setting and/or changing of various controls of the field device. Accordingly, FIG. 2 is an example representation of each device, i.e., the management device 104-108, portable management device 201, and/or one or more field devices 120-126, or a combination of these devices. The device components 200 comprise a communication bus 202 for interconnecting other device components directly or indirectly. The other device components include one or more communication components 204 communicating with other entities via a wired or wireless network, one or more processors 206, and one or more memory components 208.

The communication component 204 is configured to receive data associated with one or more points of a site from a corresponding field device of the BAS 100 and otherwise manage the field device. For example, the communication component 204 may receive data from field devices of the subsystems 112, 114. The communication component 204 may utilize wired technology for communication, such as transmission of data over a physical conduit, e.g., an electrical or optical fiber medium. For some embodiments, the communication component 204 may also utilize wireless technology for communication, such as radio frequency (RF), infrared, microwave, light wave, and acoustic communications. RF communications include, but are not limited to, Bluetooth (including BLE), ultrawide band (UWB), Wi-Fi (including Wi-Fi Direct), Zigbee, cellular, satellite, mesh networks, PAN, WPAN, WAN, near-field communications, and other types of radio communications and their variants.

The processor or processors 206 may execute code and process data received from other components of the device components 200, such as information received at the communication component 204 or stored at the memory component 208. The code associated with the BAS 100 and stored by the memory component 208 may include, but is not limited to, operating systems, applications, modules, drivers, and the like. An operating system includes executable code that controls basic functions, such as interactions among the various components of the device components 200, communication with external devices via the communication component 204, and storage and retrieval of code and data to and from the memory component 208.

Each application includes executable code to provide specific functionality for the processor 206 and/or remaining components of the management and/or field device 104-108, 120-126, 201. Examples of applications executable by the processor 206 include, but are not limited to, a control performance module 210 and an event enrollment module 212. The control performance module 210 manages the control performance measurement and management of a BAS including the determination if a settling time for a control loop. The event enrollment module 212 processes an event enrollment object, which includes information relating to the management of events for a BACnet system. The generation of normal and offnormal timestamps may be performed by the control performance module 210, the event enrollment module 212, or both. The event enrollment object communicates a device notification message in response to the occurrence of a specified event. For some embodiments, the event enrollment object may be utilized for control performance by setting the event type of the object to floating limit. By specifying an event type of floating limit, normal, high limit, and low limit event states are utilized as well as setpoint reference, time delay normal, high differential limit, and low differential limit event parameters.

For some embodiments, the event enrollment module 212 may be located in one field device while other operations, such as aspects of the control performance module 210, may be located at another field device. For example, referring to FIG. 1, control performance operations may occur at a device 122, 126 that is controlled by another device 120, 124 having the event enrollment object. For such embodiments, control performance operations may be performed at the field devices or at a management device in addition to the field devices.

For some embodiments, a field device may include a proportional integral derivative ("PID") controller to employ feedback or continuously modulated control. The PID controller continuously determines an error value or other differential. For the BAS 100, the field device includes a PID controller for precise control of temperature, pressure, flow, or any other physical property within a system. For example, the field device may be used to manage physical components, such as sensors, dampers, valves, and other controllers of the BAS. For example, a BACnet devices may include the PID controller. An environmental reading may be compared to a determined setpoint, and a control process may generate a correct control signal based on the environmental deviation from the setpoint, for example, for a valve, heater, or damper.

Data stored at the memory component 208 is information that may be referenced and/or manipulated by an operating system or application for performing functions of the management and/or field device 104-108, 120-126, 201. Examples of data associated with the BAS 100 and stored by the memory component 208 may include, but are not limited to, control loop data 214 and control performance data 216. The control loop data 214 includes the variable reference and the setpoint reference corresponding to a control loop of a field device. The control performance data 216 includes information generated and determined by the management and/or field device 104-108, 120-126, 201, such as the offnormal timestamp, the normal timestamp, and the settling time.

The device components 200 may include one or more input components 218 and one or more output components 220. The input components 218 and output components 220 of the device components 200 may include one or more visual, audio, mechanical, and/or other components. For some embodiments, the input and output components 218, 220 may include a user interface 222 for interaction with a user of the device. The user interface 222 may include a combination of hardware and software to provide a user with a desired user experience.

It is to be understood that FIG. 2 is provided for illustrative purposes only to represent examples of the device components 200 of the management and/or field device 104-108, 120-126, 201 and is not intended to be a complete diagram of the various components that may be utilized by the system. Therefore, the management and/or field device 104-108, 120-126, 201 may include various other components not shown in FIG. 2, may include a combination of two or more components, or a division of a particular component into two or more separate components, and still be within the scope of the present invention.

Figure 3:
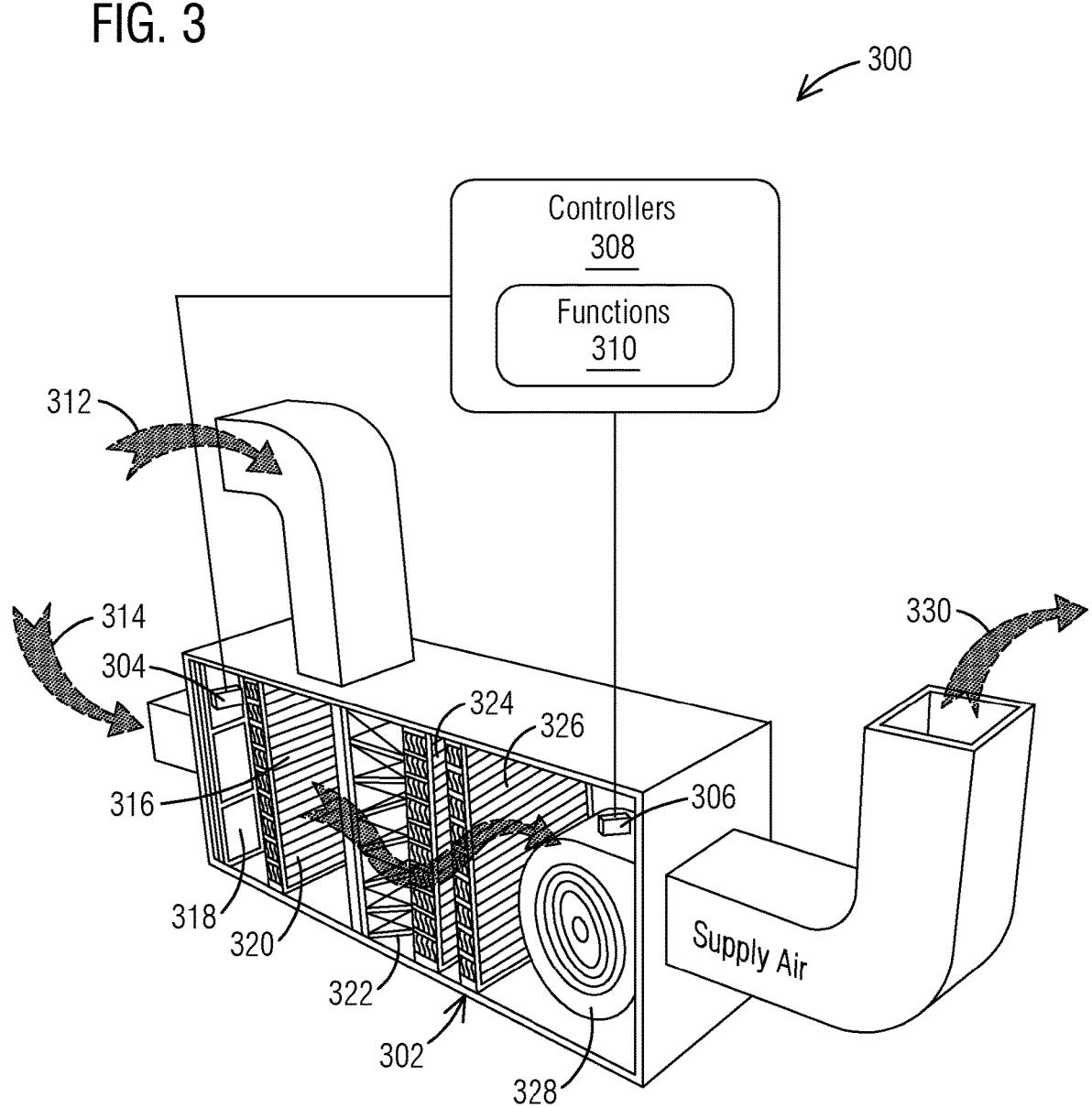
FIG. 3 depicts an example heating, ventilation, and air conditioning (HVAC) unit that may be managed by the BAS of FIG. 1.

FIG. 3 illustrates an example environmental system 300 in accordance with disclosed embodiments, in particular for this example an air handling unit 302. Each environmental system, or other devices described above in the BAS 100, includes one or more field devices, such as a sensor 304, actuator 306, and/or controller 308. Each controller 308 may have one or more associated functions 310 that control, monitor, or otherwise interact with the sensors 304 and actuators 306. Sensors 304 may include any sensors used in the corresponding device, such as thermometers, pressure sensors, airflow sensors, safety sensors such as fire or smoke detectors, motion sensors, heat sensors, or otherwise. Actuators 306 may include any controllable device, such as fans, solenoids, switches, motors, etc. The controller 308 may communicate with the management device 104-108, 201, and in some embodiments, the management device directly acts as the controller 308. This particular, non-limiting example of an air handling unit 302 illustrates elements such as the return air 312, outdoor air 314, mixing section 316, filter 318, preheat coil 320, bag filter 322, cooling coil 324, reheat coil 326, fan 328, and supply air 330.

In particular, for this example, data may be stored for each of the sensors 304, actuators 306, controllers 308, or functions 310 that indicate the state, operation, or readings of each of these components, and this data may be stored in a database, such as control loop data 214, or other storage. This data may include multiple data points for each of these elements. This data is used by functions 310, controller 308, and the management device to operate and monitor the BAS 100, including control performance measurement and management as disclosed herein. Of course, these particular sensors, actuators, controllers, and functions are for purposes of illustration, but each of the particular process implementations can use data from its own sensors, actuators, controllers, or functions, as described below.

Figure 4:
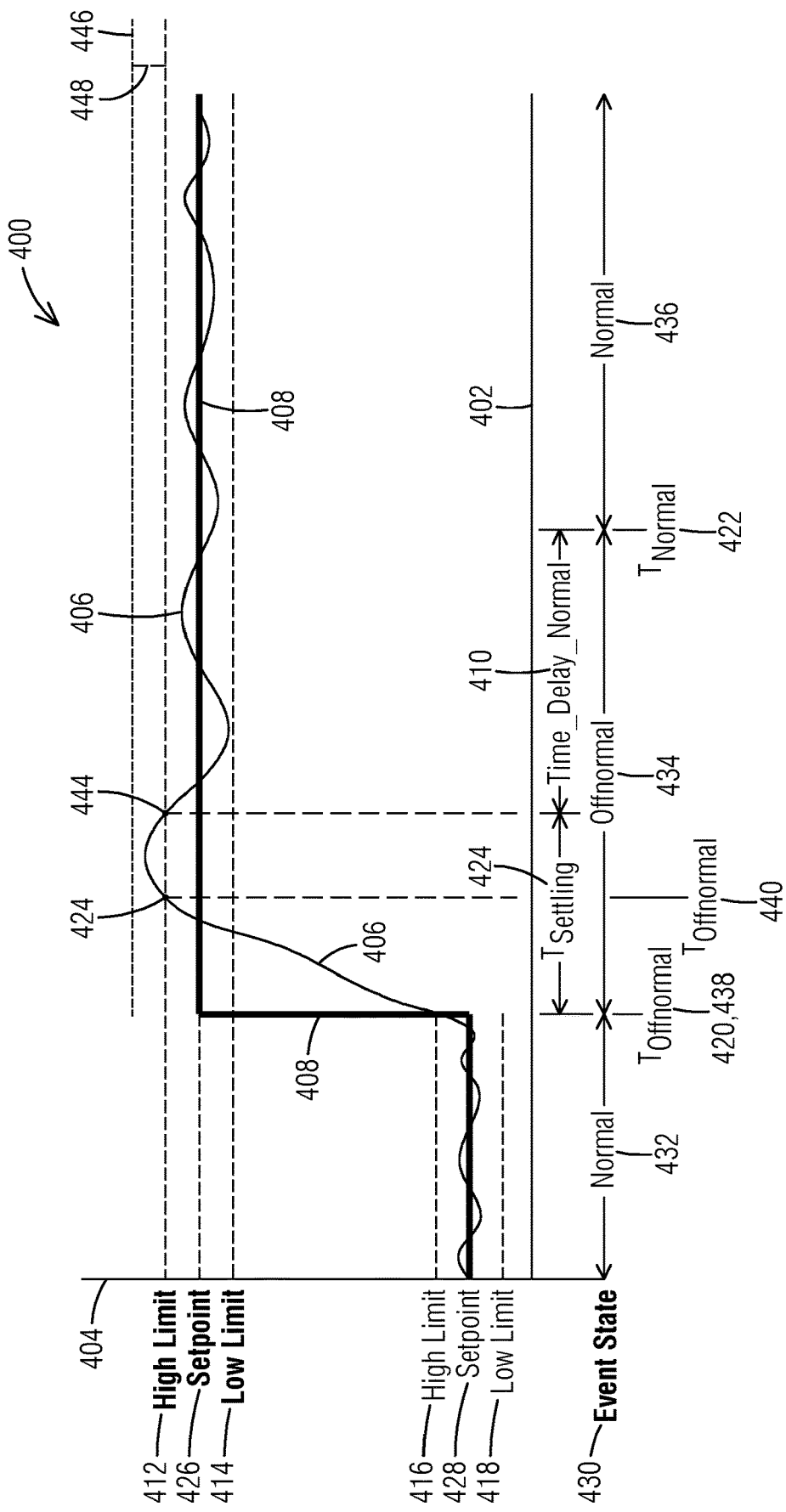

Referring to FIG. 4, there is shown a graphical view 400 illustrating control performance measurements of a building automation system ("BAS"), particularly a management device 104-108, 201 or a field device 120-126, for managing control performance of a field device. The graphical view 400 includes an x-axis 402 representing time and a y-axis 404 representing signal level. In reference to the data shown by this view, a variable reference 406 of the variable data corresponds to a control loop of the field device 120-126 and a setpoint reference 408 corresponds to the control loop of the field device.

The BAS 100 includes multiple field devices 120-126 and one or more management devices 104-108, 201. Each field device 120-126 is configured to receive the variable reference 406 and the setpoint reference 408. For some embodiments, the management device 104-108, 201 identifies a variable reference property corresponding to the variable reference 406 of the control loop and a setpoint reference property corresponding to a setpoint reference 408 of the control loop. For these embodiments, the management device 104-108, 201 or the field device 120-126 may identify the variable reference 406 and the setpoint reference 408 based on the variable reference property and the setpoint reference property.

For some embodiments, the management device 104-108, 201 communicate with the field device 120-126 to facilitate management of control performance. The management device 104-108, 201, the field device 120-126, or a coordinated operation of both the management and field devices, is configured to perform the functions described below. Event parameters 410-418 are identified, timestamps 420, 422 are generated, a settling time 424 is determined, and one or more performance features of the associated field device or devices 120-126 are modified.

A time delay normal period 410 is identified based on expected oscillations of the variable reference 406, a high settling limit 412 associated with the setpoint reference 408, and a low settling limit 414 associated with the setpoint reference 408.

An offnormal timestamp 420 may be generated based on the variable reference 406 relative to a high pre-settling limit 416 associated with the setpoint reference, a low pre-settling limit 418 associated with the setpoint reference, or both. The high and low pre-settling limits 416, 418 are different from the high and low settling limits 412, 414 since they are associated with different setpoint baselines. For some embodiments, the offnormal timestamp 420 may be generated based on a portion of the variable reference 406 transitioning outside of the high pre-settling limit 416, the low pre-settling limit 418, or both.

A normal timestamp 422 may be generated based on the variable reference 406 relative to the high settling limit 412 and the low settling limit 414. The normal timestamp 422 may be generated based on a portion of the variable reference 406 being maintained within the high settling limit 412 and the low settling limit 414 for the time delay normal period 410.

The settling time 424 of the control performance may be determined based on the normal timestamp 422, the offnormal timestamp 420, and the time delay normal period 410. For some embodiments, the settling time 424 of the control performance may be determined based on a difference of the normal timestamp 422 from the offnormal timestamp 420 and the time delay normal period 410. For example, the control performance settling time ($T_{Settling}$) may be determined by extracting the offnormal timestamp ($T_{Offnormal}$) and the time delay normal period ($T_{DelayNormal}$) from the normal timestamp ($T_{Normal}$) using the following formula: $T_{Settling} = T_{Normal} - T_{Offnormal} - T_{DelayNormal}$. For some embodiments, the settling time 424 of the control performance may be determined using a processing engine of the event enrollment object. For example, an event type of the event enrollment object may be configured as a floating limit with a specified time delay normal event parameter so that the event enrollment object may record values for the offnormal and normal timestamps 420, 422.

With the determined settling time 424, the management device 104-108, 201 and/or the field device 120-126 have a baseline on how to adjust the performance values to satisfy the control performance of the control loop. Thus, one or more performance features of an associated field device 120-126 may be modified based on the determined settling time 424. For some embodiments, one or more performance features of the field device 120-126 may be modified by adjusting the control performance of the control loop based on the settling time 424. For some embodiments, one or more performance features of the field device 120-126 may be modified by recording the normal timestamp 422, the offnormal timestamp 420, and the settling time 424 at the management device 104-108, 201 over a period of time, and performing a historical analysis of the normal timestamps 422, the offnormal timestamps 420, and the settling times 424. For some embodiments, one or more performance features of the field device 120-126 may be modified by generating an alarm fault signal based on the settling time 424 indicating a failure of the control variable to stabilize relative to the high settling limit 412, the low settling limit 414, or both, for the time delay normal period. For embodiments where the management device 104-108, 201 generates the alarm fault signal, the alarm fault signal may be generated based on a portion of the variable reference 406 being detected outside of the high settling limit 412, the low settling limit 414, or both.

As represented by FIG. 4, an event state 430 of the control loop for each field device 120-126 changes among a first normal state 432, an offnormal states 434, and a second normal state 436. The first normal state 432 is identified by the time period in which the variable reference 406 is within the high and low pre-settling limits 416, 418. For the example shown in FIG. 4, the first normal state ends when the variable reference 406 transitions beyond the high pre-settling limit 416. The second normal state 436 is identified by the time period in which the variable reference 406 is within the high and low settling limits 412, 414 for the time delay normal period 410. For example, as illustrated in FIG. 4, the second normal state 436 does not begin until the variable reference 406 has been within the high and low limits 412, 414 of the corresponding setpoint 426 for the duration of the time delay normal period 410. Accordingly, the offnormal state 434 is the time period between the first and second normal states 432, 436. The offnormal state 434 begins when the variable reference 406 moves beyond the second limits 416, 418 at the end of the first normal state 432, and the offnormal state ends when the variable reference establishes and stabilizes within the first limits 412, 414 at the beginning of the second normal state 436.

The applicable event state 430 at any given time may be based on the setpoint 426, 428 corresponding to the time, as determined by the setpoint reference 408. For example, as illustrated by example in FIG. 4, the setpoint changes from the second setpoint 428 to the first setpoint 426 after a certain period of time. Thus, the corresponding limits being monitored by the management device 104-108, 201 or the field device 120-126 may change from the high and low pre-settling limits 416, 418 to the high and low settling limits 412, 414 as well, i.e., when the event state 430 changes from the first normal state 432 to the offnormal state 434.

It should be noted that multiple offnormal states are illustrated in the example of FIG. 4. For this example, the variable reference 406 transitions beyond the high pre-settling limit 416 at a first offnormal timestamp 438 and, after positioning itself within the high and low settling limits 412, 414, the variable reference transitions beyond the high settling limit at a second offnormal timestamp 440. As shown by example in FIG. 4, the variable reference 406 may move outside of the boundaries of the settling limits 412, 414 at a first point 442 and return within the boundaries of the settling limits at a second point 444. The first instance of a transition beyond a limit, as represented by the first offnormal timestamp 438, is utilized by the management device 104-108, 201 or the field device 120-126 for determining the setting time 424 of a control performance measurement and management of a BAS 100. For some embodiments, other offnormal timestamps (such as the second offnormal timestamp 440) may be recorded with the first offnormal timestamps 438 by the management device 104-108, 201 or other devices of the BAS 100 to track and analyze the historical performance and/or indicate overshoot of one or more field devices 120-126.

Figure 5B:
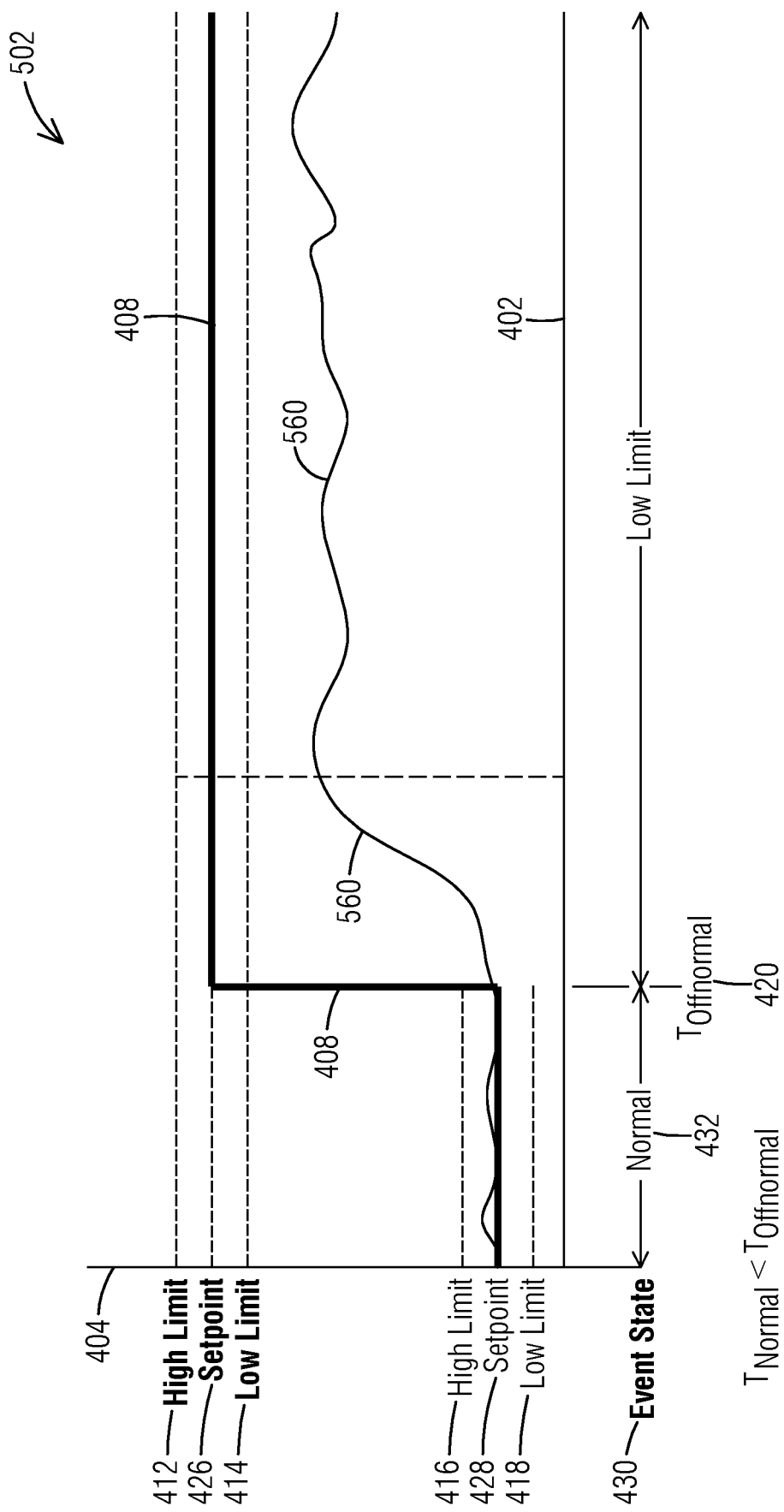

Referring to FIGS. 5A and 5B, there are shown graphical views 500, 502 illustrating other control performance measurements in an example operations by the management device 104-108, 201 or field device 120-126 of the BAS 100. The graphical view 500 of FIG. 5A is generally similar to the graphical view 400 of FIG. 4 but represents a high limit fault detection by the BAS 100 in view of a second type of variable reference 550 of the variable data. The second type of variable reference 550 rises above the high settling limit 412 and does not settle within the high settling limit 412 and the low settling limit 414 for the time delay normal period, at any time within a predetermined measurement period (represented by the length of the x-axis 402). The graphical view 502 of FIG. 5B is also generally similar to the graphical view 400 of FIG. 4 but represents a low limit fault detection by the BAS 100 in view of a third type of variable reference 560. The third type of variable reference 560 of the variable data remains below the low settling limit 414 and does not settle within the high settling limit 412 and the low settling limit 414 for the time delay normal period, at any time within the predetermined measurement period. With respect to both graphical view 500, 502, there is no new normal timestamp established (i.e., null value) so the offnormal timestamp 420 is greater than the normal timestamp and the settling time is considered to be a negative number, indicating a fault detection (high limit or low limit) by the management device 104-108, 201.

Figure 6:
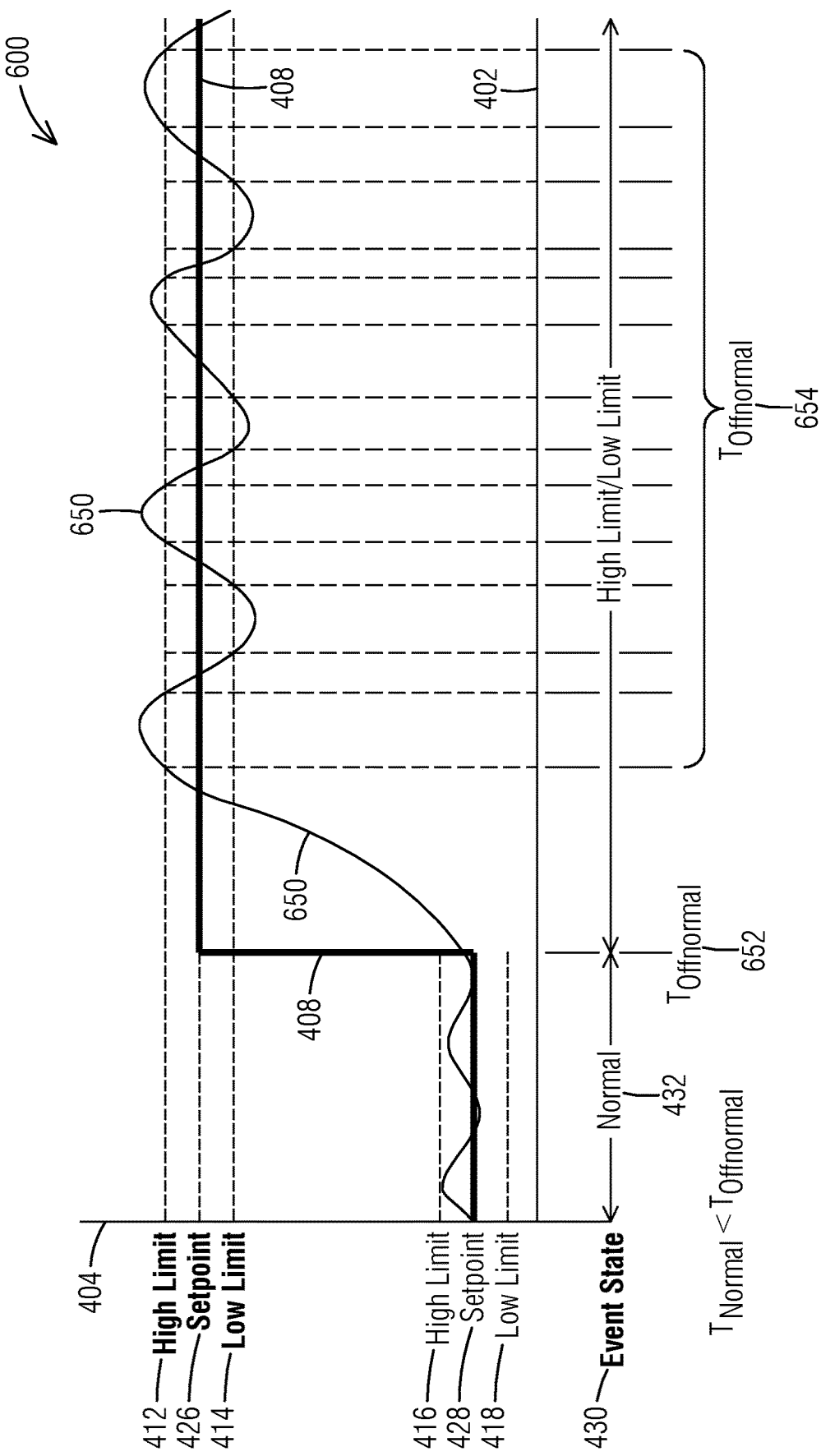

Referring to FIG. 6, there is shown a graphical view 600 illustrating yet another control performance measurement in an example operation by the management device 104-108, 201 or the field device 120-126 of the BAS 100. The graphical view 600 of FIG. 6 is generally similar to the graphical view 400 of FIG. 4 but represents an unstable fault detection by the BAS 100 in view of a fourth type of variable reference 650 of the variable data. The fourth type of variable reference 650 rises above the high settling limit 412 and lowers below the low settling limit 414. The fourth type of variable reference 650 does have portions that exist within the high settling limit 412 and the low settling limit 414 but does not settle within these settling limits for the time delay normal period, at any time within a predetermined measurement period (represented by the length of the x-axis 402). As a result, in addition to the first offnormal timestamp 652, the fourth type of variable reference 650 provides multiple subsequent offnormal timestamps 654. For the graphical view 600, there is no normal timestamp established (i.e., null value) so the offnormal timestamp 420 is greater than the normal timestamp and the settling time is considered to be a negative number, indicating an unstable fault detection by the management device 104-108, 201. For some embodiments, the subsequent offnormal timestamps 654 may be recorded with the first offnormal timestamps 652 by the management device 104-108, 201 or other devices of the BAS 100 to track and analyze the historical performance of one or more field devices 120-126.

Figure 7:
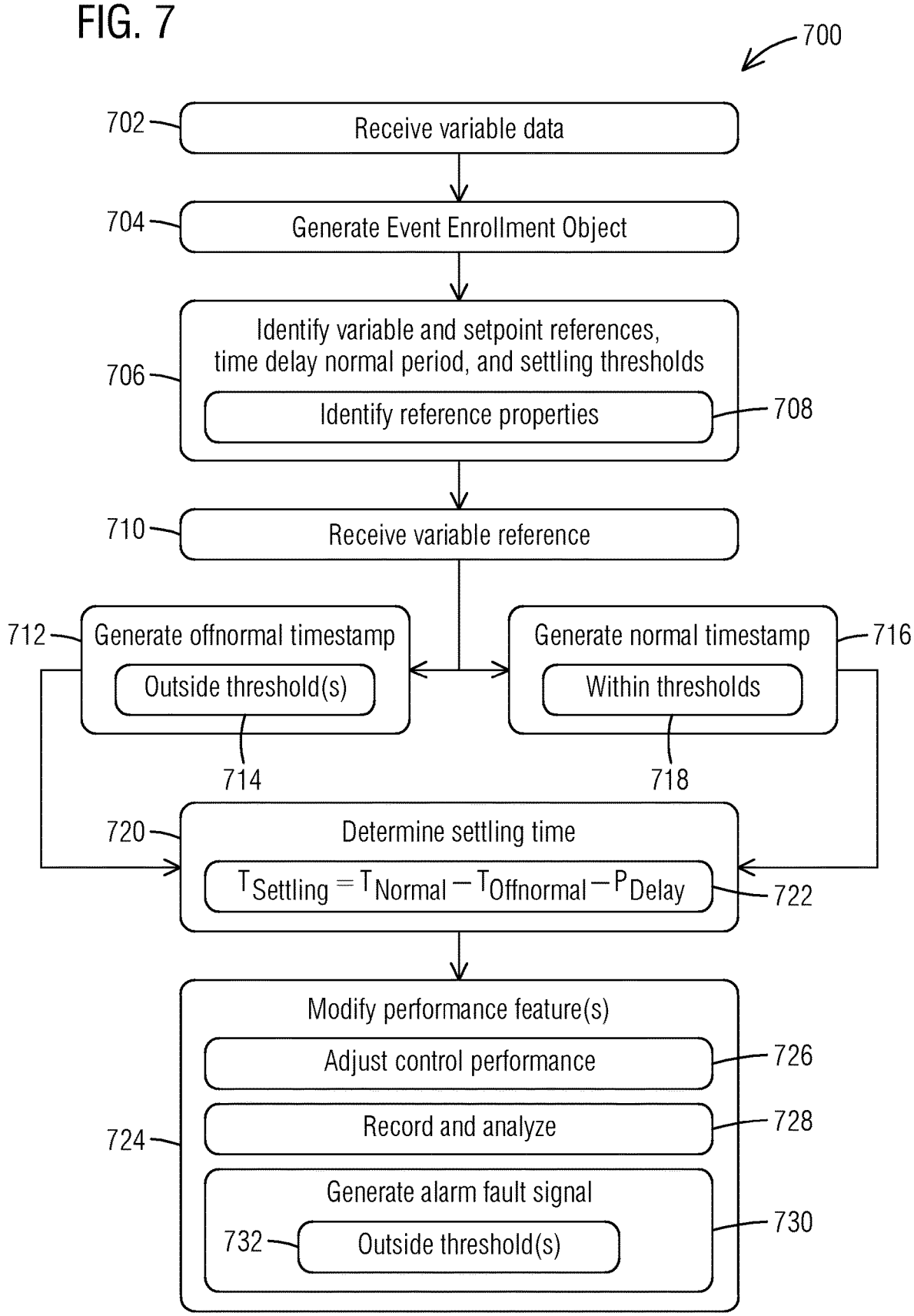
FIG. 7 is a flow diagram depicting an example operation of a management device of the BAS, such as those shown with the BAS of FIG. 1.

FIG. 7 depicts a flowchart of an exemplary operation 400 that may be executed by a BAS 100 to perform control performance measurement and management techniques as described herein. The control performance measurement and management approach may be initiated by the management device 104-108, 201 or the field device 120-126 (702). In particular, the field device 120-126 receives (702) variable data in the course of its operation and/or some activation of the operation 400. For some embodiments, an event enrollment object for the field device 120-126 may be generated (704) at or after initiation of the operation 400 to manage and track events, i.e., changes in value, of properties relating to one or more objects that meet specific criteria. For some embodiments, the event enrollment object may be located at one field device while other operations may occur at another field device. For example, some operations may be performed at a field device 122, 126 that is controlled by another field device 120, 124 that includes the event enrollment object.

The variable reference 406 of the variable corresponding to a control loop of the field device 120-126 may be identified, and the setpoint reference 408 corresponding to the control loop of the field device may be identified (706). For some embodiments, a variable reference property corresponding to the variable reference 406 of the control loop may be identified, and a setpoint reference property corresponding to a setpoint reference 408 of the control loop may be identified (708). For these embodiments, the variable reference 406 and the setpoint reference 408 are identified (706) in response to identifying (708) the variable reference property and the setpoint reference property by the management device 104-108, 201. The variable reference 406 of the variable data may be received (710) in response to identifying (706) the variable reference. The variable reference 406 may be communicated from the management device 104-108, 201 to the field device 120-126, between field devices, or between components of the field device.

In addition to identifying the variable reference and the setpoint reference, a time delay normal period 410 is identified (706) based on expected oscillations of the variable reference 406. The management device 104-108, 201 may also identify (706) a high settling limit associated with the setpoint reference 408 and a low settling limit associated with the setpoint reference 408. The identification of the time delay normal period 410, the high settling limit, and/or the low settling limit may occur anytime during the operation 400 so long as they occur before the timestamp generations and settling time 424 determination described below.

An offnormal timestamp 420 is generated (712) based on the variable reference 406 relative to a high pre-settling limit associated with the setpoint reference 408, a low pre-settling limit associated with the setpoint reference 408, or both. The high and low pre-settling limits are different from the high and low settling limits since the different groups of limits are associated with different setpoint baselines. For some embodiments, the offnormal timestamp 420 may be generated (712) in response to identifying the variable reference (706) or identifying the time delay normal period 410 (710). For some embodiments, the offnormal timestamp 420 may be generated (712), while identifying the variable reference 406 (706), in response to a portion of the variable reference transitioning (714) outside of at least one of the high pre-settling limit or the low pre-settling limit.

A normal timestamp 422 is generated (716) based on the variable reference 406 relative to the high settling limit and the low settling limit. For some embodiments, the normal timestamp 422 may be generated (716) in response to identifying the variable reference (706) or identifying the time delay normal period 410 (710). For some embodiments, the normal timestamp 422 may be generated (716), while identifying the variable reference 406 (706), in response to a portion of the variable reference 406 being maintained (718) within the high settling limit and the low settling limit for the time delay normal period 410.

The management device 104-108, 201, the field device 120-126, or the coordination of the management and field devices determines (720) a settling time 424 of the control performance based on the normal timestamp 422, the offnormal timestamp 420, and the time delay normal period 410. For some embodiments where an event enrollment object for the field device 120-126 is generated (704), the settling time 424 of the control performance may be determined (720) using a processing engine of the event enrollment object. In this manner, the management device 104-108, 201 and/or the field device 120-126 may efficiently leverage the existing processing engine of the event enrollment object for this particular function of the control performance approach. For some embodiments, the settling time 424 of the control performance may be determined (722) based on a difference of the normal timestamp 422 from the offnormal timestamp 420 and the time delay normal period 410.

One or more performance features of the field device 120-126 are modified (724) based on the determined settling time 424, i.e., in response to determining the settling time 424 (720). For some embodiments, the management device 104-108, 201 or the field device 120-126 may adjust (726) the control performance of the control loop based on the settling time 424. For some embodiments, the management device 104-108, 201 may record (728) the normal timestamp 422, the offnormal timestamp 420, and the settling time 424 at the management device 104-108, 201 over a period of time, and perform a historical analysis at the management device 104-108, 201 of the normal timestamps 422, the offnormal timestamps 420, and the settling times 424 recorded over the period of time. For some embodiments, the management device 104-108, 201 may generate (730) an alarm fault signal in response to the settling time 424 indicating a failure of the variable reference 550, 560, 650 to stabilize relative to the at least one of the high settling limit or the low settling limit for the time delay normal period 410. For embodiments where the alarm fault signal is generated (730), the management device 104-108, 201 may generate (732) the alarm fault signal in response a portion of the variable reference 550, 560, 650 being detected outside of at least one of the high settling limit or the low settling limit.

Figure 8:
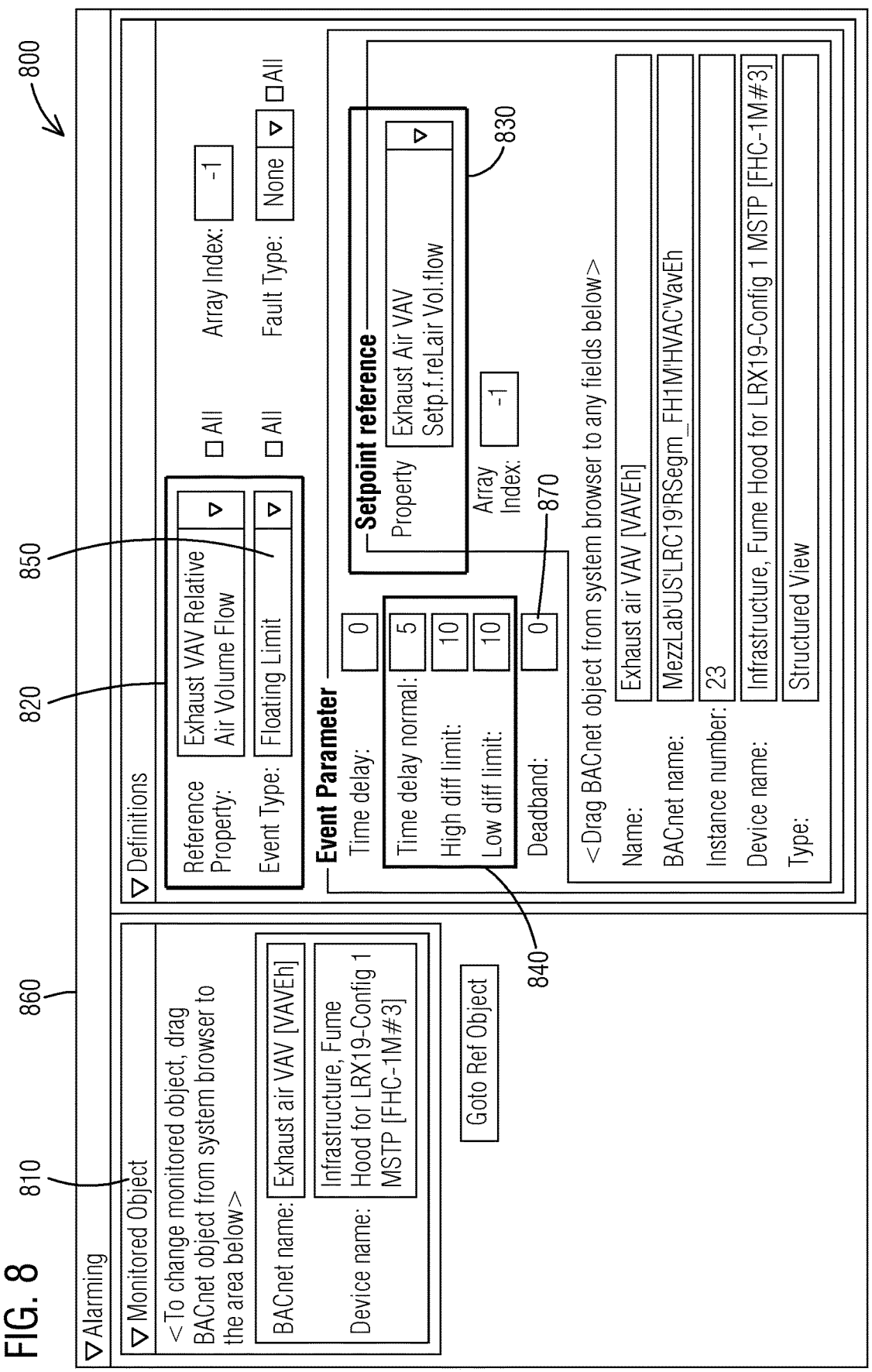
FIGS. 8 and 9 are screen views of an event enrollment object that may be utilized in an example implementation that is operable to employ techniques described herein.

Referring to FIG. 8, there is shown an input screen view 800 of an event enrollment object 810 that may be utilized in an example implementation that is operable to employ techniques described herein. As described above in reference to FIG. 2, the management device 104-108, 201 or the field device 120-126 may include a user interface 222. The user interface 222 may provide a manner in which certain information for the control loop may be provided. In particular, the user interface 222 may receive the variable reference property 820 corresponding to the variable reference 406, the setpoint reference property 830 corresponding to the setpoint reference 408 and a time delay normal entry corresponding to the time delay normal period 410 at an event parameter section 840. The variable reference property 820 corresponds to the variable controlled by the control loop, and the setpoint reference property 830 corresponds to the setpoint value for the control loop. The time delay normal entry corresponds to a desire entry that is large enough to reject expected oscillations of the variable reference.

For some embodiments, the user interface 222 may also receive high and low differential limit entries, corresponding to the high and low settling limits 412, 414, at the event parameter section 840. For some embodiments, the event type 850 of the event enrollment object may also be specified, such as an event type of floating limit. Also, the management device 104-108, 201 or the field device 120-126 modifies one or more performance features of an associated field device 120-126 based on the determined settling time 424 so the above information about the event enrollment object 810 may be entered in such a manner as to indicate the type or types of performance features 860, such as an alarm fault detection.

For yet other embodiments, the deadband 870 may be configured for the event enrollment object 810 to set tighter settling limits for the determination of the settling time. For example, FIG. 4 represents control performance measurements of a BAS having a deadband of zero and more than one offnormal timestamp. The settling time may be improved by increasing the high settling limit 412, the low settling limit 414, or both, and introducing a deadband within the high and low settling limits. Accordingly, the settling limit(s) 412, 414 may be adjusted to a different level 446 to decrease the likelihood of an overshoot (as illustrated between the settling time 424 and the second point 444) and still determine the normal timestamp 422 within a subrange 448 between the high and low settling limits as adjusted by the deadband for the time delay normal period 410. In this manner, the deadband manages the settling limits while minimizing the likelihood of triggering multiple offnormal timestamps.

Figure 9:
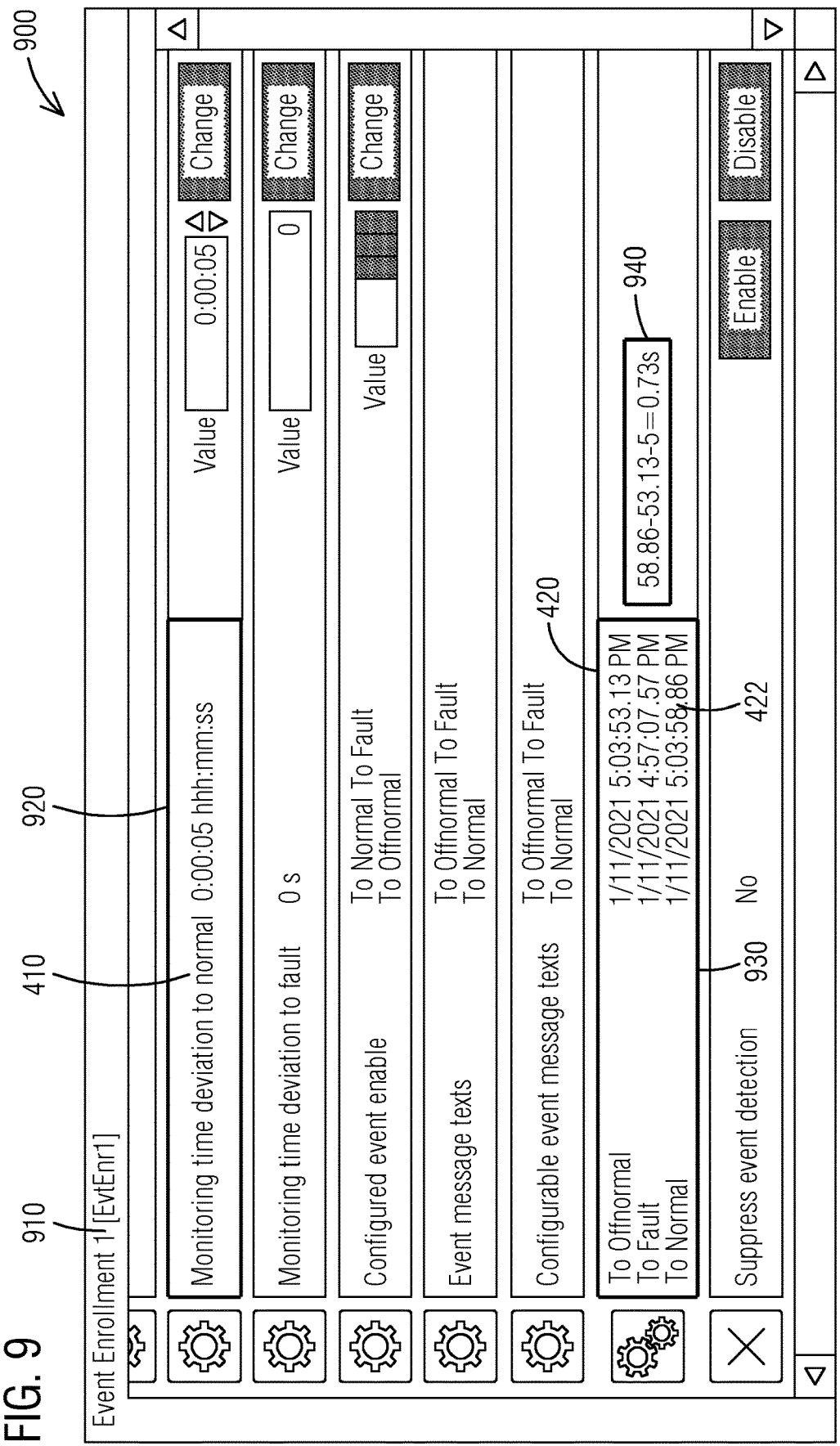

Referring to FIG. 9, there is shown an output screen view 900 of the event enrollment object 910 that may be utilized in an example implementation. The management device 104-108, 201 and/or the field device 120-126 receives information for the event enrollment object in order to manage control performance for the field device 120-126. To facilitate an understanding of the operation of the event enrollment object, FIG. 9 provides a possible, but not required, visual view of the user interface 222 to illustrate the operation. The user interface 222 may provide an acknowledgment window 920 of certain information of the control loop, such as the time delay normal period 410. The user interface 222 may also provide an operation window 930 of certain information determined, such as the offnormal and normal timestamps 420, 422.

Referring to both FIGS. 8 and 9, the event enrollment object 810, 910 may configure the event type as a floating limit with a particular time delay normal and record offnormal and normal timestamp values. The event enrollment object 810, 910 may determine the control performance settling time ($T_{settling}$) based on the timestamp values ($T_{Normal}$ & $T_{Offnormal}$) and the time delay normal value ($T_{DelayNormal}$) using the following formula: $T_{Settling} = T_{Normal} - T_{Offnormal} - T_{DelayNormal}$. Optionally, the calculation output 940 of the settling time, or an indicator representing the calculation, may be shown at the output screen view 900. The calculated settling time may be utilized as a baseline to adjust the performance features, such as PID values, to satisfy the control performance of the control loop. For example, a PID control loop may be tuned and achieve a desired settling time and, thereafter, the settling time may be monitor automatically for events, trends, or alarms when the setpoint exceeds either the high or low differential limit. The management device 104-108, 201, or a device coordinated with the field device 120-126, may be used to record the timestamp values for historical analysis and monitoring of drift in control performance. Furthermore, if one or more settling times are negative in value for an extended period of time, then the management device 104-108, 201, the field device 120-126, and/or a coordinated device may determine that the control performance is unstable and/or faulty (e.g., high limit fault, low limit fault, unstable fault, and the like).

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A method for managing control performance of a building automation device, the method comprising:
   receiving variable data at a field device;
   identifying a variable reference and a setpoint reference corresponding to a control loop of a proportional integral derivative (PID) controller of the field device and associated with the variable data;
   identifying a time delay normal period based on expected oscillations of the variable reference, a high settling limit associated with the setpoint reference, and a low settling limit associated with the setpoint reference;
   generating an offnormal timestamp based on the variable reference relative to at least one of a high pre-settling limit associated with the setpoint reference or a low pre-settling limit associated with the setpoint reference, the high and low pre-settling limits being different from the high and low settling limits;
generating a normal timestamp based on the variable reference relative to the high settling limit and the low settling limit;
determining a settling time of the control performance based on the normal timestamp, the offnormal timestamp, and the time delay normal period;
modifying at least one PID value of the PID controller with respect to a high, low, or unstable control loop based on the settling time, wherein the at least one PID values of the control loop of the PID controller is adjusted based on the settling time to tune the control loop of the PID controller with the settling time; and
the tuned PID controller of the field device performs continuous modulated control, based on a continuous determination of an error value generated by comparing a measured value and determined setpoint, of a physical property comprising of temperature, pressure or flow of a physical component of comprising a valve, heater, or damper.

2. The method as described in claim 1, further comprising identifying a variable reference property corresponding to the variable reference and a setpoint reference property corresponding to the setpoint reference, wherein the variable reference and the setpoint reference of the control loop are identified in response to identifying the variable reference property and the setpoint reference property.

3. The method as described in claim 1, wherein generating the offnormal timestamp includes generating the offnormal timestamp in response to a portion of the variable reference transitioning outside of at least one of the high pre-settling limit or the low pre-settling limit.

4. The method as described in claim 1, wherein generating the normal timestamp includes generating the normal timestamp in response to a portion of the variable reference being maintained within the high settling limit and the low settling limit for the time delay normal period.

5. The method as described in claim 1, wherein determining the settling time of the control performance includes determining the settling time of the control performance based on a difference of the normal timestamp from the offnormal timestamp and the time delay normal period.

6. The method as described in claim 1, further comprising generating an event enrollment object for the field device, wherein determining the settling time of the control performance includes determining the settling time of the control performance using a processing engine of the event enrollment object.

7. A building automation system for managing control performance of a building automation device comprising:
a field device configured to receive variable data at the field device, the field device having at least one performance feature modified for fault detection and diagnostic with respect to a high, low, or unstable control loop based on a settling time; and
at least one of either the field device or a management device being configured to:
identifying a variable reference and a setpoint reference corresponding to a control loop of a proportional integral derivative (PID) controller of the field device and associated with the variable data;
identifying a time delay normal period based on expected oscillations of the variable reference, a high settling limit associated with the setpoint reference, and a low settling limit associated with the setpoint reference;
generating an offnormal timestamp based on the variable reference relative to at least one of a high pre-settling limit associated with the setpoint reference or a low pre-settling limit associated with the setpoint reference, the high and low pre-settling limits being different from the high and low settling limits;
generating a normal timestamp based on the variable reference relative to the high settling limit and the low settling limit; and
determining a settling time of the control performance based on the normal timestamp, the offnormal timestamp, and the time delay normal period;
modifying at least one PID value of the PID controller with respect to a high, low, or unstable control loop based on the settling time, wherein the at least one PID values of the control loop of the PID controller is adjusted based on the settling time to tune the control loop of the PID controller with the settling time; and
the tuned PID controller of the field device performs continuous modulated control, based on a continuous determination of an error value generated by comparing a measured value and determined setpoint, of a physical property comprising of temperature, pressure or flow of a physical component of comprising a valve, heater, or damper.

8. The building automation system as described in claim 7, wherein:
a variable reference property corresponding to the variable reference is identified;
a setpoint reference property corresponding to a setpoint reference is identified; and
the variable reference and the setpoint reference of the control loop are identified based on the variable reference property and the setpoint reference property.

9. The building automation system as described in claim 7, wherein the offnormal timestamp is generated based on a portion of the variable reference transitioning outside of at least one of the high pre-settling limit or the low pre-settling limit.

10. The building automation system as described in claim 7, wherein the normal timestamp is generated based on a portion of the variable reference being maintained within the high settling limit and the low settling limit for the time delay normal period.

11. The building automation system as described in claim 7, wherein the settling time of the control performance is determined based on a difference of the normal timestamp from the offnormal timestamp and the time delay normal period.

12. The building automation system as described in claim 7, wherein:
an event enrollment object for the field device is generated; and
the settling time of the control performance is determined using a processing engine of the event enrollment object.

* * * * *